June 3, 1941.   P. VAN RIEL   2,244,034
PURIFICATION OF OIL IN A CENTRIFUGAL SEPARATOR
Filed March 2, 1940
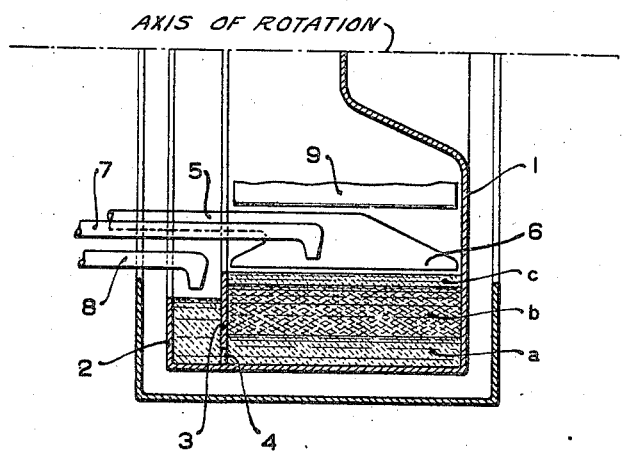
INVENTOR.
Pieter van Riel.
BY
PATENT ATTORNEY Patented June 3, 1941

2,244,034

UNITED STATES PATENT OFFICE 2,244,034

PURIFICATION OF OIL IN A CENTRIFUGAL SEPARATOR

Pieter van Riel, Delft, Netherlands, assignor to N. V. Machinefabriek "Reineveld," Delft, Netherlands, a company of the Netherlands Application March 2, 1940, Serial No. 321,953
In the Netherlands April 23, 1938

2 Claims. (Cl. 233—14)

It has already been proposed to rid oil of colloidal and other impurities in a centrifugal separator. In a known vertical separator for this purpose, as disclosed by British Patent No. 418,568, the rotor is formed by a drum provided with a conical top having an inwardly projecting circumferential flange, and also with a central cylindrical admission chamber connected to which is a flaring bottom cone having an outwardly flanged lower rim. Mounted between said rim and the bottom of the drum is an annular baffle, which is connected to the rim by a ring of spaced tubular ducts. The oil to be purified, and water are separately and continuously fed into the admission chamber, so that the water forms films on the inner walls of both the admission chamber with bottom cone and the drum with top cone, said layers communicating through the spaces intermediate said ducts. The oil also forms two films, which "float" on the said films of water and communicate through the tubular ducts. Any impurities that are thrown outward from the oil by centrifugal action collect in the water, which is continuously discharged over the flange of the conical drum top, whereas the purified oil is continuously discharged through an aperture nearer to the axis of the drum.

My present invention, which has for its object the intermittent purification of oil in a centrifugal separator, also contemplates the flushing of impurities thrown outwardly from the oil by means of a liquid having a specific gravity exceeding that of the oil.

In accordance with said invention, the oil is treated in a separator drum provided with an inwardly projecting flange and with an annular partition between said flange and the bottom of the drum, the partition having, near the cylindrical drum wall, an aperture through which the spaces on either side of said partition are in communication with one another, the modus operandi being such that the spinning drum is first supplied with a layer of carrier liquid heavier than oil and of sufficient thickness to form a hydraulic seal on said aperture, whereupon a charge of oil is fed into the drum so as to form a film on the layer of carrier liquid, and finally a charge of wash-liquid heavier than oil is admitted onto the film of oil, said wash-liquid, after being suitably accelerated, being thrown by centrifugal force through the oil into the carrier liquid, with which it is spilled over said flange. During its movement through the oil the wash-liquid takes up impurities therefrom.

It is pertinent here to remark that it is not new to wash oil in continuous operation by means of a centrifugal separator, as disclosed in French Patent 685,744. In accordance with this prior suggestion, the oil and the wash-liquid, ordinarily water, are emulsified in a central, bladed admission chamber located within the centrifugal drum and from which the emulsion is forced into the space between said chamber and the circumferential wall of the drum. In said space, both liquids are separated by centrifugal force, and the wash-liquid is carried away in the ordinary manner, together with any impurities taken up by said liquid from the oil.

In order that my invention may be more readily understood, I shall now proceed to describe the same with reference to the annexed diagrammatic drawing, which illustrates, by way of example only, an axial section of the charged drum of a horizontal centrifugal separator.

The drum 1 is provided, on the side opposite its bottom, with an inwardly projecting annular flange 2. At some distance inwardly from, and in parallel relation with said flange an annular partition 3 is secured to the inner wall of drum 1, said partition having at least one aperture 4 close to said wall.

A supply pipe 5 having an elongated nozzle 6 is provided for feeding liquid into the drum intermediate its bottom and the partition 3.

The separator is further equipped with two skimming pipes 7 and 8, serving for removing liquid from the spaces intermediate the bottom and the partition 3, and between the partition and the flange 2, respectively, and also with a knife 9.

In accordance with my invention, this separator is used as follows, for instance, for removing colloidal and other impurities from say, linseed oil.

During high speed rotation of the drum, a carrier liquid heavier than oil, for instance water, is supplied to the drum through pipe 5, 6, until this liquid hydraulically seals the aperture 4. Thereupon linseed oil, either or not heated to, say, 50–60° C., is fed into the drum, also by means of pipe 5, 6, until the level of the carrier liquid in the space intermediate flange 2 and partition 3 is substantially flush with the inner edge of said flange. Finally, a film of wash-liquid, for instance, cold or hot water, or a weak aqueous solution of sodium chloride, is allowed to flow into the drum, also through pipe 5, 6.

The drum thus contains three concentric layers of liquid, said layers being indicated by $a$ (carrier liquid), $b$ (linseed oil) and $c$ (wash-liquid), respectively. As long as there is a substantial difference between the circumferential speeds of layers b and c, the wash-liquid, although it is specifically heavier than the oil, will "float" on the oil, but as soon as said difference has decreased to a predetermined value, the wash-liquid, under the action of the centrifugal force, is thrown outwardly through the oil and into the carrier liquid. During its movement through the oil, liquid c washes every particle of the oil so as to take up any impurities that may still be contained therein and carry them away outwardly. Consequently, a certain amount of carrier liquid and of wash-liquid overflows the inner edge of flange 2.

The purified oil, which still floats on layer a, is thereupon discharged from the rotating drum by means of the skimming pipe 7, whereupon a second charge of oil can be treated in the manner described.

Any solids that may accumulate on the inner wall of drum 2 can from time to time be removed by means of the knife 9 and the skimming pipe 8.

The various operations described hereinbefore can be carried out manually, or mechanically.

The term "oil" should be construed to include vegetable, animal and mineral oils.

Since the wash-liquid necessarily mixes with the carrier liquid, it is preferred to use one type of liquid for both washing the oil and flushing the impurities.

What I claim is:

1. In a method for removing undesired impurities from oil and the like, the steps of subjecting a carrier liquid heavier than oil and immiscible with the latter to centrifugal force thus causing the carrier liquid to form a layer having a substantially cylindrical inner surface, then feeding impure oil onto said surface while subjecting it still to centrifugal force thus causing said oil to float on said liquid forming on the latter a layer having a substantially cylindrical inner surface, finally feeding wash-liquid heavier than oil and immiscible with said oil onto the inner surface of said oil layer while still subjecting said carrier layer and said oil layer to centrifugal force thus causing said wash-liquid to float on the oil layer and forming a third layer, and accelerating said wash-liquid until it migrates through the oil layer into said carrier layer thereby removing impurities from said oil layer.

2. In a method for removing undesired impurities from oil and the like forming three layers of liquids by first subjecting a carrier liquid heavier than oil and immiscible therewith to centrifugal force thus causing said carrier liquid to form a substantially cylindrical layer, then supplying impure oil upon said layer while still subjecting the same to centrifugal force whereby said oil is forced to float onto said carrier liquid forming on the latter a substantially cylindrical second layer, finally feeding wash-liquid heavier than said oil and immiscible therewith to the upper surface of said second layer while still subjecting said first and second layers to centrifugal force thus causing said wash-liquid to float on the oil layer and forming a third layer above said oil layer, and thereafter sufficiently accelerating said wash-liquid layer whereby the latter penetrates through the oil layer into said carrier layer thereby removing impurities from said oil layer.

PIETER VAN RIEL.